(No Model.)
2 Sheets—Sheet 1.
J. C. SCHUMAN.
MANUFACTURE OF STARCH.
No. 318,308.  Patented May 19, 1885.
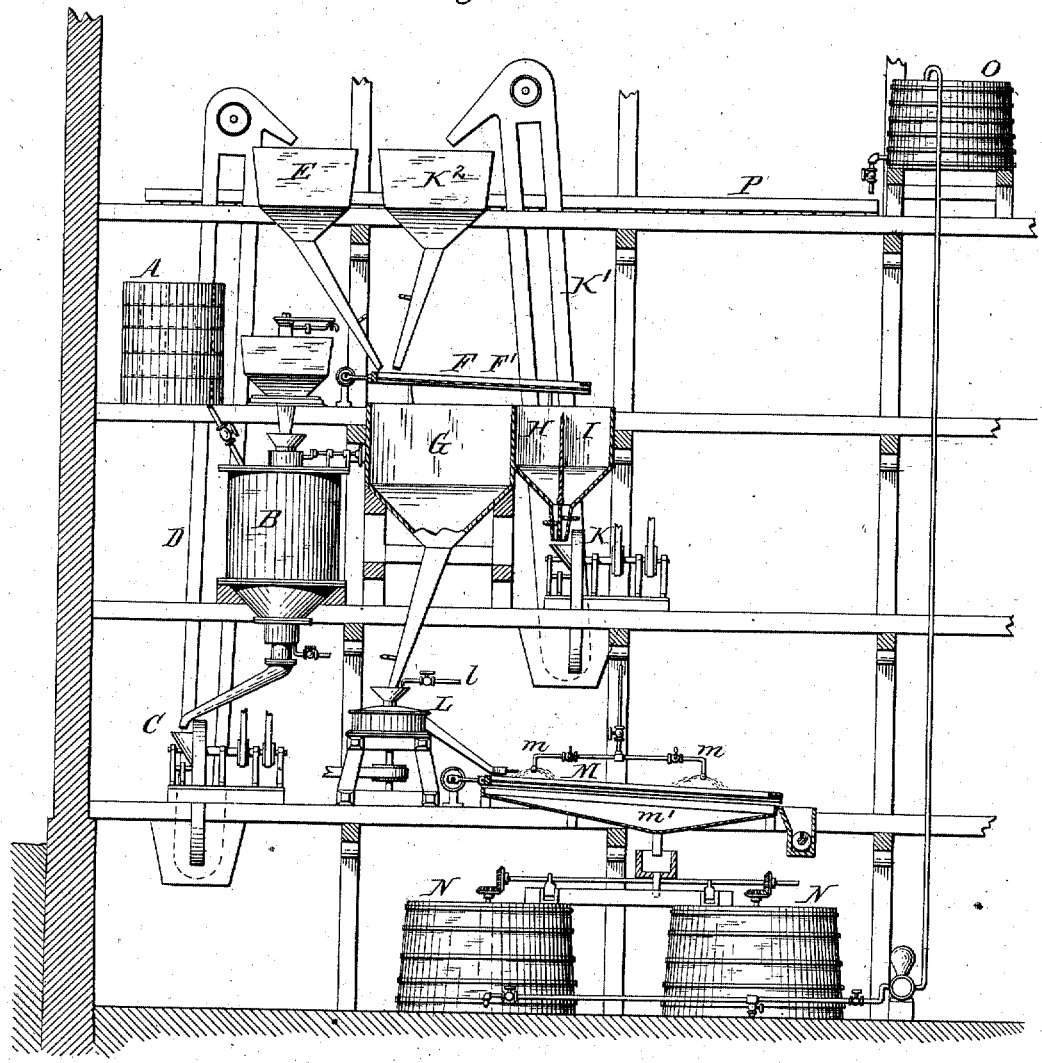

(No Model.) 2 Sheets—Sheet 2.
J. C. SCHUMAN.
MANUFACTURE OF STARCH.
No. 318,308. Patented May 19, 1885.
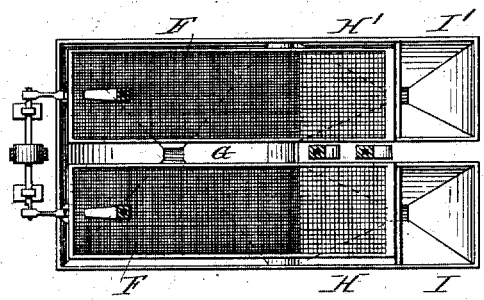
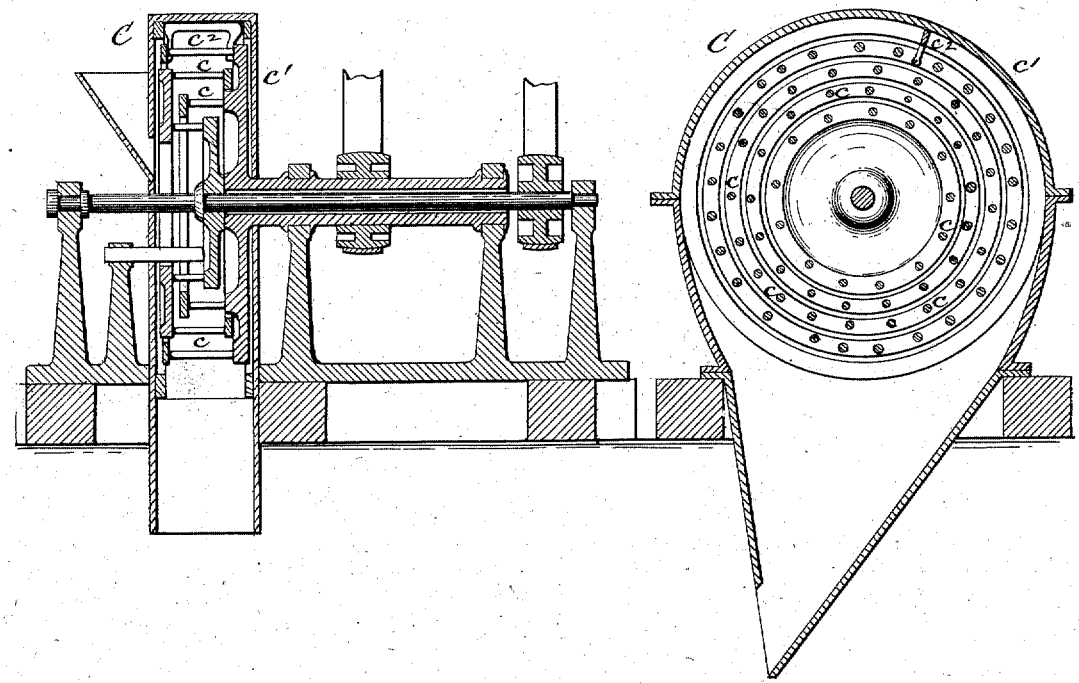

UNITED STATES PATENT OFFICE.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 318,308, dated May 19, 1885.

Application filed April 22, 1885. (No specimens.)

*To all whom it may concern:*

Be it known that I, JOHN C. SCHUMAN, of Akron, in the county of Erie and State of New York, have invented new and useful Improvements in the Manufacture of Starch, of which the following is a specification.

This invention relates to an improved method of manufacturing commercial starch, such as laundry and culinary starch, from Indian corn or maize, in a simple and economical manner. A kernel of Indian corn consists of three principal parts—viz., the inner portion or body, which consists principally of starch-cells, the outer inclosing-hull and its glutinous lining, which consist of wood fiber, nitrogenous compounds, albumen, and oil, which are useful for cattle-feed, and the germ or chit, which is very rich in oil.

In extracting the crude starch from Indian corn wet processes have been generally employed. The oldest process is the sour or fermentation process, in which the gluten and oil are eliminated by fermentation. This process is very objectionable in many respects, and is now obsolete. The process which is now in general use is the so-called "sweet process," in which the corn is ground with water and the starch is washed and sifted out of the ground corn, and the gluten and oil are eliminated from the starch by caustic alkali. In both of these processes the gluten and oil become mixed with the starch in grinding the corn, and have to be afterward removed therefrom, which is a difficult and laborious operation, requiring large quantities of water and alkali and rendering the process expensive, while leaving the offal in very undesirable wet condition. The wet offal is usually passed through a squeezing-machine for the purposes of extracting the bulk of the moisture and recovering some of the starch which adheres to the offal; but this machine is ineffective for the last-named purpose because it presses or cakes the starch particles and the fragments of hulls together and causes these parts to adhere more strongly to each other.

The object of this invention is to avoid these difficulties by thoroughly removing the hulls and germs from the starchy portions of the kernels, and then treating such separated starchy portions alone for producing refined starch; and my invention consists, to that end, of the improvements which will be hereinafter fully described, and pointed out in the claims.

In the accompanying drawings, consisting of two sheets, Figure 1 is a sectional elevation of a plant of machinery by which my invention can be carried out. Fig. 2 is a top plan view of the separating-sieves. Figs. 3 and 4 are sectional elevations of the reducing-machine at right angles to each other.

Like letters of reference refer to like parts in the several figures.

A represents a water-tank, which contains hot water used for steeping the corn.

B represents a tank or vat in which the corn is steeped, and which is supplied with water from the tank A, and constructed with a perforated false bottom for draining. The corn is steeped in this tank at a temperature of about 140° Fahrenheit for about fifteen hours, whereby the grain becomes expanded or swelled. This temperature is maintained in the steeping-tank by renewing the water from time to time. When the corn has been steeped, the starchy body of each kernel has become enlarged and soft, the germ has become similarly enlarged, and tends to separate itself, by reason of its oily character, from the surrounding portions of the starchy body which has absorbed water, and the hull has become tough and tends to separate, together with its glutinous lining, from the starchy body and oily germ. In steeping the corn, care is taken that the temperature does not rise to 155° Fahrenheit, at which temperature the sacks of the starch-cells begin to burst and discharge their contents. When the corn has been steeped, the warm water is drained off and the cold water is introduced into the tank B, whereby the corn is chilled and the hulls are further toughened and the oily germs further loosened from the surrounding portions of the starchy bodies. The water is then drained off from the corn in the tank B.

C represents a reducing-machine, which receives the steeped corn from the tank B, and in which the grain is whipped or beaten, whereby the hulls and their glutinous linings are opened and stripped in large flakes from the inner starchy bodies and from the germs, the starchy bodies being at the same time reduced to fine granules, while the germs are detached from the starchy portions and hulls without being pulverized. The reducing-machine C consists of several concentric rows of beaters $c$, revolving at a high speed in opposite directions within an inclosing-case, $c'$.

In order to facilitate the discharge of the material from this machine, the outer row of beaters is provided with one or more scrapers, $c^2$, which prevent the material from adhering to the inner side of the inclosing-case of the machine. The corn is reduced in this machine in the moist condition in which it comes from the steep and without additional water. The reduced material is discharged from the reducing-machine C into the foot of an elevator, D, whereby it is conducted to a receiving-hopper, E.

F represents a separating-screen, which receives the reduced material from the hopper E and separates the same into three products—viz., the fine fragments or granules of crude starch, the germs which are somewhat larger in size, and the flakes of hulls and glutinous linings which are still larger. To this end the screen is closed for about two-thirds of its length from its head with fine wire-cloth, which permits only the starch-granules to pass through, and for the remainder of its length with coarse wire-cloth, which permits the germs to pass through, while the hulls or coarse offal escape over the tail of the screen.

G represents a receiver which collects the starchy material which passes through the upper finely-clothed portion of the screen.

H represents a receiver which collects the germs passing through the lower coarsely-clothed portion of the screen, and I is a receiver which collects the hulls escaping over the tail of the screen.

K is a supplementary reducing-machine, constructed like the machine C, in which the steeped grain is reduced, and receiving the hulls and germs, either or both, from the hoppers H and I, for the purpose of detaching from these products of the separation any starch particles which may adhere to the same, if such further treament is necessary or desirable. The reduced material coming from the machine K is conducted by an elevator, K', into a hopper, K², from which it is spouted upon a separating-screen, F', which is arranged on one side of the screen F, and which effects a separation of the detached meal from the germs and hulls, the meal passing into the receiver G and the germs and hulls into receivers H' and I'.

L is a reducing-mill, which receives the starch-meal from the receiver G, and in which the starch-meal is ground with water which passes from a pipe, $l$, between the grinding-surfaces of the mill.

M is a separating-sieve, which is covered with bolting-cloth, and which receives the ground meal from the mill L and effects a separation of the starch from the remaining fibrous matter or offal. The sieve M is provided with perforated pipes $m$, which deliver sprays of water upon the sieve, whereby the starch is washed through the meshes of the sieve, while the offal or fibrous material tails off. The water and starch are collected in a gutter or trough, $m'$, below the sieve and conducted therefrom into receiving-vats N, in which the starch is permitted to settle, and from which the water is drawn off from above the starch after the latter has settled to the bottom; or, if preferred, the starch may be deposited out of the water on inclined tables or runs in a well-known manner. Fresh water is then mixed with the starch deposited in the vats N, or with the starch deposited on the tables and removed therefrom, in sufficient quantity to permit the mixture to be freely agitated. A solution of caustic alkali is next introduced into the starch-liquid in the vats N in the proportion of about one-eighth of a pound of alkali to the product from each bushel of grain, the alkaline solution weighing about $2\frac{1}{2}°$ Baumé. This alkaline solution is thoroughly mixed with the starch-liquid by the agitators with which the vats N are provided, and water is added to the mixture until its gravity is reduced to about $3°$ Baumé. The liquid is next pumped to a receiving-tank, O, and passed from the latter to inclined tables or troughs P, upon which the starch is deposited, while the liquid refuse escapes from the lower ends of the tables or troughs; or, if preferred, the starch may be settled in instead of depositing it on tables. The deposited starch is next broken up and again mixed with water in a suitable vat and then permitted to settle, and the water is drawn off from above the starch, whereby any remaining traces of alkali and other impurities are removed from the starch. This operation of settling and washing may be repeated as often as may be necessary to produce starch of the desired degree of purity. The refined starch is then placed in molds and dried in a suitable kiln, unless it is desired to make green starch, when the operation of drying is omitted.

In this method of manufacturing refined starch the hulls and germs are separated from the crude starch in a slightly moist or comparatively dry state, whereby these products are recovered in a condition which permits the same to be preserved for a considerable length of time without deteriorating by fermentation, and in which they can be dried at small expense in a suitable drying apparatus, if desired. As the hulls and germs are separated from the crude starch before the latter is treated with alkali, they constitute a very desirable food for cattle, &c., and the germs can be pressed to extract the oil and the oil-cakes can be used as feed. The hulls and germs constitute about eighteen per cent. of the whole grain operated upon; or, in other words, a bushel of corn weighing fifty-six pounds produces about nine pounds of hulls and germs. This portion of the raw material is removed at the outset from the starch-meal to be further manipulated, whereby the quantity of water and alkali required for the further treatment is greatly reduced, as well as the size and capacity of the vats and conduits in which the treatment is carried on. The power necessary for moving and manipulating the material is also correspondingly reduced. The yield of refined starch obtained by this improved method is considerably larger than that resulting from the methods heretofore used.

It is obvious that the apparatus can be modified to suit the requirements of the ultimate product which it is desired to manufacture, and as may be required to adapt the apparatus to the peculiarities of the building in which it is placed.

I claim as my invention—

1. The herein-described process of manufacturing refined starch from Indian corn, which consists in steeping the corn, then detaching the hulls and germs from the starchy portions of the kernels by whipping or beating without additional water, then separating the hulls and germs from the crude starch by sifting, and then refining the separated crude starch, substantially as set forth.

2. The herein-described process of manufacturing refined starch from Indian corn, which consists in steeping the corn, then detaching the hulls and germs from the starchy portions of the kernels by whipping or beating without additional water, then separating the hulls and germs from the crude starch by sifting, then grinding the separated crude starch with water, and then refining the ground starch, substantially as set forth.

3. The herein-described process of manufacturing refined starch from Indian corn, which consists in steeping the corn, then detaching the hulls and germs from the starchy portions of the kernels by whipping or beating without additional water, then separating the hulls and germs from the crude starch by sifting, then grinding the separated crude starch with water, then separating the remaining fibrous matter or offal from the starch by sifting, then treating the separated starch with caustic alkali, and depositing the starch, substantially as set forth.

4. The herein-described process of manufacturing refined starch from Indian corn, which consists in steeping the corn, then detaching the hulls and germs from the starchy portions of the kernels by whipping or beating without additional water, then separating the hulls and germs from the crude starch by sifting, then grinding the separated crude starch with water, then separating the remaining fibrous matter or offal from the starch by sifting, then treating the separated starch with caustic alkali, and then removing the remaining traces of impurities by repeatedly depositing and washing the starch, substantially as set forth.

Witness my hand this 20th day of April, 1885.

J. C. SCHUMAN.

Witnesses:
S. B. GOODALE,
E. W. HOAGLAND.

It is hereby certified that in Letters Patent No. 318,308, granted May 19, 1885, upon the application of John C. Schuman, of Akron, New York, for an improvement in the "Manufacture of Starch," errors appear in the printed specification requiring correction, as follows: In line 27, page 2, the word "closed" should read *clothed;* in line 101, same page, the word *vats* should be read between the words "in" and "instead;" and that the Letters Patent should be read with these corrections therein to make it conform to the record of the case in the Patent Office.

Signed, countersigned, and sealed this 2d day of June, A. D. 1885.

[SEAL.]

H. L. MULDROW,
*Acting Secretary of the Interior.*

Countersigned:
ROBT. B. VANCE,
*Acting Commissioner of Patents.*